(12) United States Patent
Tsuruzono

(10) Patent No.: US 11,863,337 B2
(45) Date of Patent: Jan. 2, 2024

(54) EQUIPMENT MANAGEMENT DEVICE, EQUIPMENT MANAGEMENT METHOD, AND PROGRAM

(71) Applicant: Sharp NEC Display Solutions, Ltd., Tokyo (JP)

(72) Inventor: Kengo Tsuruzono, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 17/764,110

(22) PCT Filed: Jul. 3, 2020

(86) PCT No.: PCT/JP2020/026212
§ 371 (c)(1),
(2) Date: Mar. 25, 2022

(87) PCT Pub. No.: WO2021/065130
PCT Pub. Date: Apr. 8, 2021

(65) Prior Publication Data
US 2022/0337444 A1 Oct. 20, 2022

(30) Foreign Application Priority Data
Sep. 30, 2019 (WO) .................. PCT/JP2019/038485

(51) Int. Cl.
*H04L 12/18* (2006.01)
(52) U.S. Cl.
CPC ...... *H04L 12/1831* (2013.01); *H04L 12/1822* (2013.01)
(58) Field of Classification Search
CPC .......... H04L 12/1831; H04L 12/1822
See application file for complete search history.

(56) References Cited

U.S. PATENT DOCUMENTS

2004/0205419 A1* 10/2004 Liang .................... H04L 63/145
714/57
2012/0278408 A1 11/2012 Seferian et al.
(Continued)

FOREIGN PATENT DOCUMENTS

JP H04-334194 A 11/1992
JP 2009-217706 A 9/2009
(Continued)

OTHER PUBLICATIONS

International Search Report (ISR) (PCT Form PCT/ISA/210), in PCT/JP2020/026212, dated Sep. 29, 2020.
(Continued)

*Primary Examiner* — John A Follansbee
*Assistant Examiner* — Raqiul A Choudhury
(74) *Attorney, Agent, or Firm* — McGinn I.P. Law Group, PLLC

(57) ABSTRACT

An acquirer acquires abnormality information indicating that an abnormality has occurred in equipment provided in a conference room. The equipment is, for example, a display device such as a display or a projector. A conference information generator generates conference information indicating a progress status of a conference which is carried out in the conference room by processing information output from a device provided in the conference room. An information transmitter determines a first timing which is a timing at which abnormality-relevant information which is information to be transmitted due to occurrence of the abnormality is transmitted using the conference information and transmits the abnormality-relevant information to the equipment or another device at the first timing.

19 Claims, 4 Drawing Sheets

(56) References Cited

U.S. PATENT DOCUMENTS

| | | | |
|---|---|---|---|
| 2014/0368605 A1* | 12/2014 | Liu | H04N 7/152 |
| | | | 348/14.09 |
| 2015/0304120 A1* | 10/2015 | Xiao | G06Q 10/0631 |
| | | | 370/260 |
| 2017/0093931 A1* | 3/2017 | Chinnapatlolla | H04L 12/1822 |
| 2017/0094225 A1* | 3/2017 | Morita | H04N 7/147 |
| 2017/0357917 A1 | 12/2017 | Holmes et al. | |
| 2018/0069962 A1* | 3/2018 | Kato | H04N 7/15 |
| 2019/0130365 A1* | 5/2019 | Pell | G06Q 10/1095 |
| 2020/0018509 A1* | 1/2020 | Nagahara | F24F 11/54 |

FOREIGN PATENT DOCUMENTS

| | | |
|---|---|---|
| JP | 2009-223604 A | 10/2009 |
| JP | 2011-008747 A | 1/2011 |
| JP | 2016-095582 A | 5/2016 |
| JP | 2019-077033 A | 5/2019 |
| JP | 6566601 B1 | 8/2019 |

OTHER PUBLICATIONS

International Search Report (ISR) (PCT Form PCT/ISA/210), in PCT/JP2019/038485, dated Dec. 10, 2019.

Zhao Ping et al: "Camera-based measurement of relative image contrast in projection displays", European Workshop on Visual Information Processing (EUVIP), University Paris 13, Jun. 10, 2013 (Jun. 10, 2013), pp. 112-117, XP032500379.

Jin Zhou et al: "Multi-projector display with continuous self-calibration", Proceedings of the 5th ACM/IEEE International Workshop on Projector Camera Systems, Procams '08, ACM Press, New York, New York, USA, Aug. 10, 2008 (Aug. 10, 2008), pp. 1-7, XP058201649, DOI: 10.1145/1394622.1394626 ISBN: 978-1-60558-272-6.

Extended European Search Report in European Application No. 20872726.3 dated Sep. 18, 2023.

\* cited by examiner

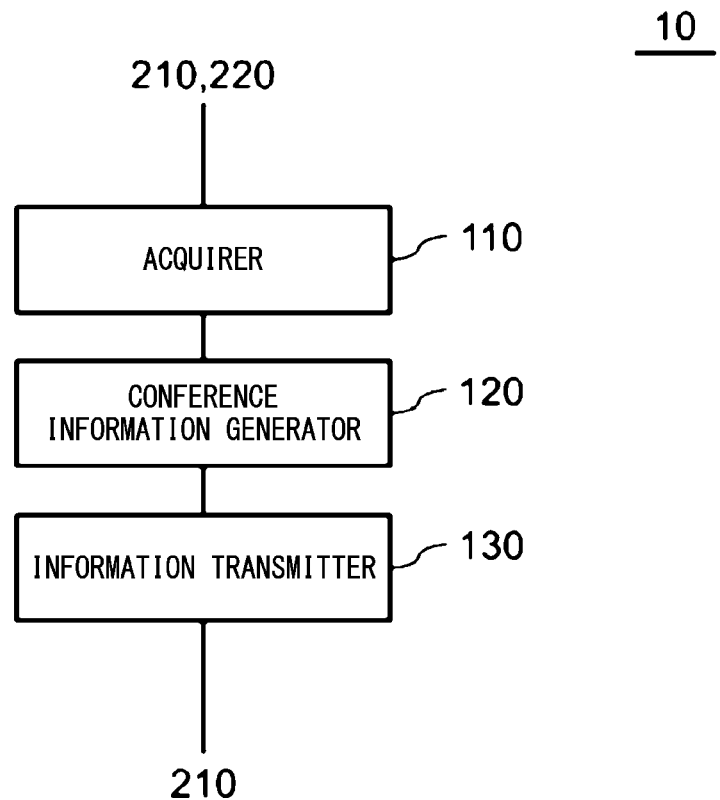
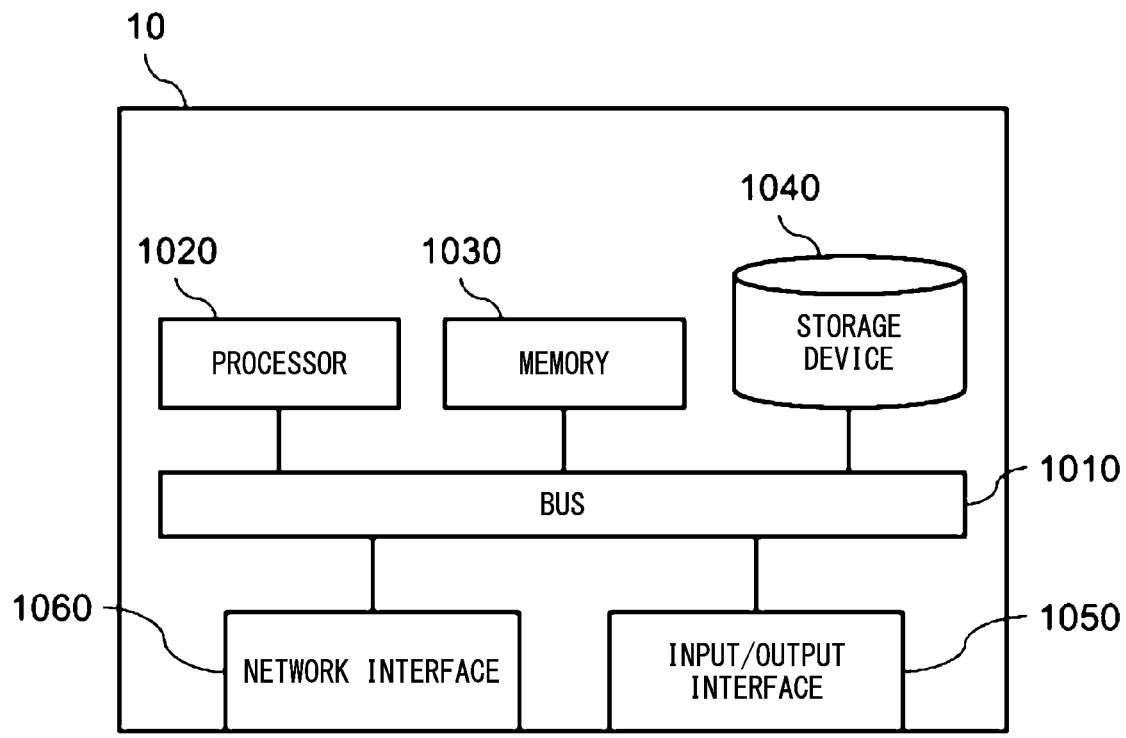

US 11,863,337 B2

EQUIPMENT MANAGEMENT DEVICE, EQUIPMENT MANAGEMENT METHOD, AND PROGRAM

TECHNICAL FIELD

The present invention relates to an equipment management device, an equipment management method, and a program.

BACKGROUND ART

Conference rooms are used by various parties. Accordingly, conditions of conference rooms need to be managed. A conference room management system described in Patent Literature 1 determines whether a conference room is being used using results of detection from an illuminance sensor and a temperature sensor.

CITATION LIST

Patent Literature

[Patent Literature 1]
Japanese Unexamined Patent Application, First Publication No. 2019-77033

SUMMARY OF INVENTION

Technical Problem

A conference room is provided with various types of equipment such as a projector or a display and air conditioning equipment. When an abnormality occurs in such equipment, predetermined information may be transmitted. On the other hand, a timing at which the information is to be transmitted is not fixed in consideration of smooth progress of a conference.

An objective of the present invention is to enable transmission of information based on an abnormality at an appropriate timing when the abnormality occurs in equipment of a conference room.

Solution to Problem

According to the present invention, there is provided an equipment management device including: an acquirer configured to acquire abnormality information indicating that an abnormality has occurred in equipment provided in a conference room; a conference information generator configured to generate conference information indicating a progress status of a conference which is carried out in the conference room by processing information output from a device provided in the conference room; and an information transmitter configured to make a first timing different, the first timing being a timing at which abnormality-relevant information which is information to be transmitted due to occurrence of the abnormality is transmitted according to the progress status of the conference indicated by the conference information and to transmit the abnormality-relevant information to the equipment or another device at the first timing.

According to the present invention, there is provided an equipment management method that is performed by a computer, the equipment management method including: acquiring abnormality information indicating that an abnormality has occurred in equipment provided in a conference room; generating conference information indicating a progress status of a conference which is carried out in the conference room by processing information output from a device provided in the conference room; and making a first timing different, the first timing being a timing at which abnormality-relevant information which is information to be transmitted due to occurrence of the abnormality is transmitted according to the progress status of the conference indicated by the conference information and transmitting the abnormality-relevant information to the equipment or another device at the first timing.

According to the present invention, there is provided a program causing a computer to perform: acquiring abnormality information indicating that an abnormality has occurred in equipment provided in a conference room; generating conference information indicating a progress status of a conference which is carried out in the conference room by processing information output from a device provided in the conference room; and making a first timing different, the first timing being a timing at which abnormality-relevant information which is information to be transmitted due to occurrence of the abnormality is transmitted according to the progress status of the conference indicated by the conference information and transmitting the abnormality-relevant information to the equipment or another device at the first timing.

Advantageous Effects of Invention

According to the present invention, it is possible to transmit information based on an abnormality at an appropriate timing when the abnormality occurs in equipment of a conference room.

BRIEF DESCRIPTION OF DRAWINGS

The aforementioned objectives and other objectives, features, and advantages will be apparent from the following exemplary embodiments and the following attached drawings.

FIG. 2 is a diagram illustrating an example of a functional configuration of the equipment management device.

FIG. 3 is a block diagram illustrating a hardware configuration of the equipment management device.

DESCRIPTION OF EMBODIMENTS

Figure 1:
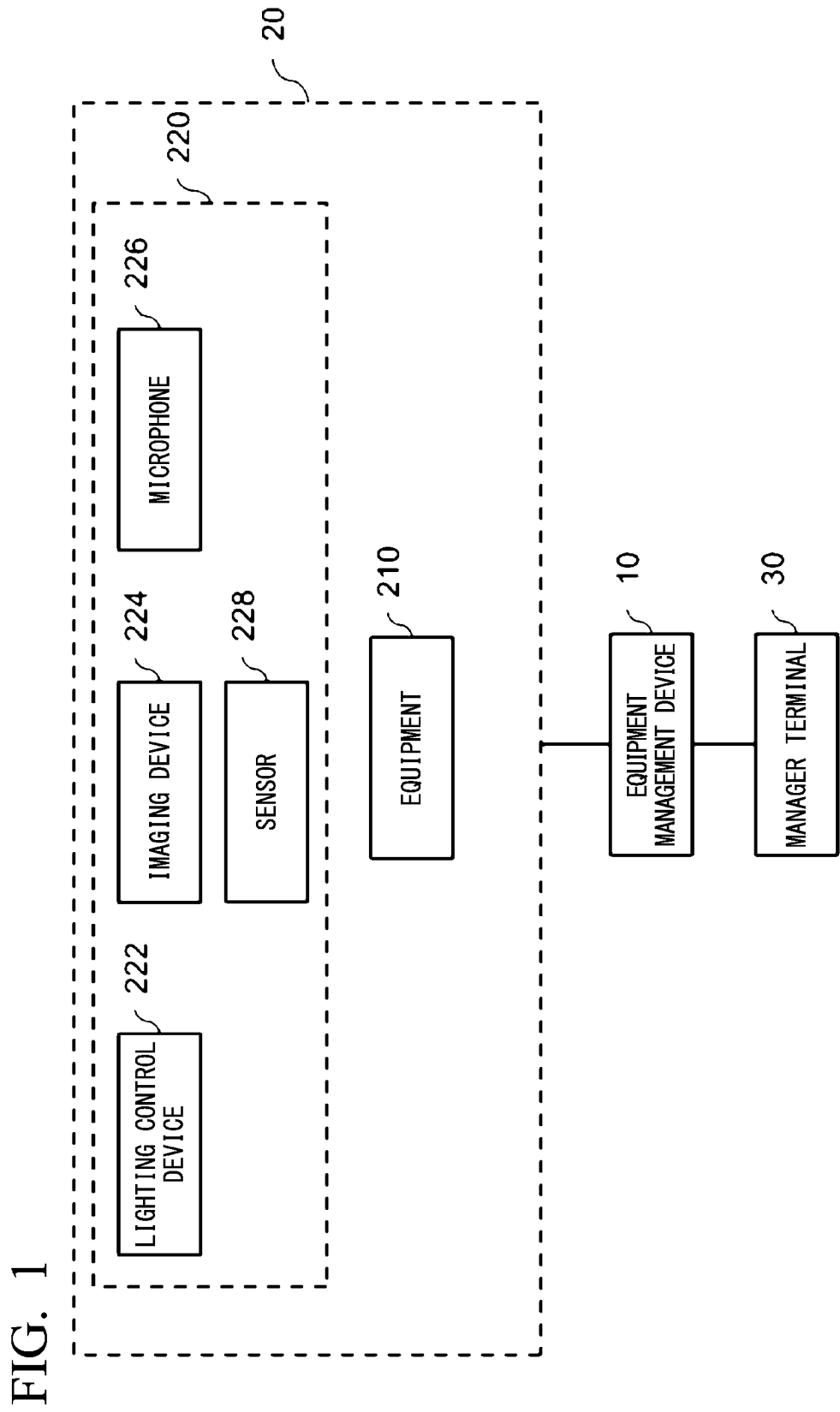
FIG. 1 is a diagram illustrating an environment for use of an equipment management device according to a first embodiment.

Hereinafter, embodiments of the present invention will be described with reference to the accompanying drawings. In the drawings, the same elements will be referred to by the same reference signs and description thereof will be appropriately omitted.

First Embodiment

FIG. 1 is a diagram illustrating an environment for use of an equipment management device 10 according to a first embodiment. The equipment management device 10 is a device that manages equipment 210 provided in a conference room 20.

For example, the equipment 210 is a display device such as a display or a projector. The equipment 210 may be, for example, air conditioning equipment having a temperature control function, may be lighting equipment, or may be equipment having a battery therein (for example, a radio microphone, a remote controller, or an electronic pen). The equipment 210 transmits information indicating an operation state of the equipment 210 (hereinafter referred to as operation information) to the equipment management device 10 and transmits information indicating that an abnormality has occurred (hereinafter referred to as abnormality information) to the equipment management device 10 when the abnormality has occurred in the equipment 210. When the abnormality information is received, the equipment management device 10 transmits abnormality-relevant information relevant to the abnormality information to the equipment 210 or another device (for example, another device in the conference room 20). The abnormality-relevant information is information which is to be transmitted due to occurrence of an abnormality and is, for example, control information for the equipment 210. In the following description, abnormality-relevant information is considered to be control information unless otherwise mentioned. A device in the conference room 20 is, for example, the equipment 210. In this case, the equipment 210 operates according to control information transmitted from the equipment management device 10.

As described above, a destination of the abnormality-relevant information may be a device other than the equipment 210. For example, when the abnormality-relevant information is questionnaire data as will be described later in another embodiment, the destination of the abnormality-relevant information may be a display device in the conference room 20 or a terminal carried into the conference room 20.

A device group 220 is provided in the conference room 20. The device group 220 generates information which is required for the equipment management device 10 to generate control information and which is information on the inside of the conference room 20 (hereinafter referred to as room information) and transmits the generated information to the equipment management device 10. In the example illustrated in the drawing, the device group 220 includes a lighting control device 222, an imaging device 224, a microphone 226, and a sensor 228. The abnormality information may not be generated by the equipment 210 but may be generated by causing the equipment management device 10 to analyze the room information generated by the device group 220.

The lighting control device 222 is a device that controls a lighting device provided in the conference room 20. The equipment management device 10 identifies a lighting state, for example, an on/off state and a lighting intensity, of the lighting device in the conference room 20 by processing information transmitted from the lighting control device 222.

The imaging device 224 repeatedly images the inside of the conference room 20 and transmits generated images to the equipment management device 10. The equipment management device 10 generates information on persons in the conference room 20 (hereinafter referred to as person information) by processing the images. The person information includes, for example, the number of persons and individual positions and movements thereof in the conference room 20.

The microphone 226 generates voice information indicating voice in the conference room 20 and transmits generated voice information to the equipment management device 10. The equipment management device 10 generates necessary data by processing the voice information. For example, the equipment management device 10 generates text data indicating words spoken in the conference room 20 by performing a voice recognition process on the voice information.

The sensor 228 includes at least an illuminance sensor and a temperature sensor and transmits information indicating detection values to the equipment management device 10. The equipment management device 10 can also detect an abnormality in the device group 220 by processing the information transmitted from the sensor 228. For example, when the equipment 210 is a lighting device and the information transmitted from the lighting control device 222 indicates that the equipment 210 is turned on, it is determined that an abnormality has occurred in the equipment 210 when the detection value from the illuminance sensor which is the sensor 228 does not satisfy a reference. When the equipment 210 is air conditioning equipment having a temperature control function, it is determined that an abnormality has occurred in the equipment 210 when the detection value from the temperature sensor which is the sensor 228 departs from a temperature range estimated on the basis of the operation information of the equipment 210 (for example, a set temperature).

The equipment management device 10 causes a terminal of a manager who manages the equipment 210 (hereinafter referred to as a manager terminal 30) to display information on the abnormality occurring in the equipment 210 according to necessity.

The devices or equipment in the conference room 20 may communicate with another device in a wired manner or a wireless manner.

FIG. 2 is a diagram illustrating an example of a functional configuration of the equipment management device 10. The equipment management device 10 includes an acquirer 110, a conference information generator 120, and an information transmitter 130.

The acquirer 110 acquires operation information and abnormality information from the equipment 210 and acquires various types of information from the device group 220.

The conference information generator 120 generates information indicating a status of a conference which is carried out in the conference room 20 (hereinafter referred to as conference information) by processing information output from the device group 220. The conference information includes at least one of information indicating that a conference is in progress, information indicating that a conference has stopped, and information indicating that a conference has ended. A specific example of the routine which is performed by the conference information generator 120 will be described later.

The information transmitter 130 makes a timing different, the timing being a timing at which abnormality-relevant information, for example, control information, is transmitted to the equipment 210 (hereinafter referred to as a first timing) according to a preference progress status of the conference indicated by the conference information generated by the conference information generator 120. Then, the information transmitter 130 transmits the abnormality-relevant information to the equipment 210 at the first timing. When the first timing is made different according to a progress status of the conference, the information transmitter 130 selects the first timing from a plurality of candidates. Examples of the plurality of candidates include a timing at which the abnormality-relevant information is transmitted immediately and a timing at which the abnormality-relevant information is transmitted later. A specific example of the routine which is performed by the information transmitter 130 and a specific example of the abnormality-relevant information will be described later.

FIG. 3 is a block diagram illustrating a hardware configuration of the equipment management device 10. The equipment management device 10 includes a bus 1010, a processor 1020, a memory 1030, a storage device 1040, an input/output interface 1050, and a network interface 1060.

The bus 1010 is a data transmission path that allows the processor 1020, the memory 1030, the storage device 1040, the input/output interface 1050, and the network interface 1060 to transmit and receive data to and from each other. A method of connecting the processor 1020 and the like is not limited to the bus.

The processor 1020 is a processor that is realized by a central processing unit (CPU), a graphics processing unit (GPU), or the like.

The memory 1030 is a main storage device that is realized by a random access memory (RAM).

The storage device 1040 is an auxiliary storage device that is realized by a hard disk drive (HDD), a solid state drive (SSD), a memory card, a read only memory (ROM), or the like. The storage device 1040 stores program modules for realizing functions (for example, the acquirer 110, the conference information generator 120, and the information transmitter 130) of the equipment management device 10. By causing the processor 1020 to read the program modules into the memory 1030 and to execute the program modules, the functions corresponding to the program modules are realized.

The input/output interface 1050 is an interface that connects various input/output devices to the equipment management device 10.

The network interface 1060 is an interface that connects the equipment management device 10 to other devices (for example, the equipment 210, the device group 220, and a manager terminal 30) over a network.

Figure 4:
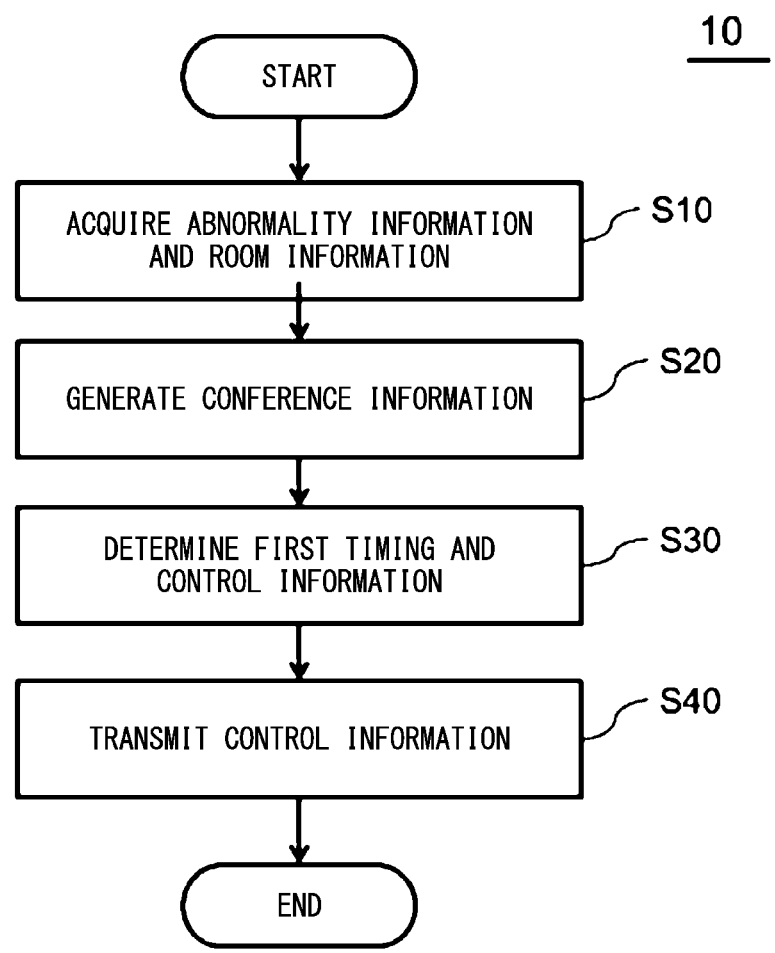
FIG. 4 is a flowchart illustrating an example of a routine which is performed by the equipment management device.

FIG. 4 is a flowchart illustrating an example of a routine that is performed by the equipment management device 10. As described above, the equipment 210 in the conference room 20 transmits abnormality information when an abnormality occurs in the equipment 210. The abnormality information includes information indicating the type of the equipment 210 and information indicating the type of the abnormality (for example, an error code).

The acquirer 110 of the equipment management device 10 acquires abnormality information from the equipment 210 and acquires room information generated by the device group 220 (Step S10). Here, the acquirer 110 may normally acquire room information regardless of the abnormality information or may acquire room information when abnormality information is acquired. In the latter, the acquirer 110 may start acquisition of the room information after the abnormality information has been acquired. When the room information is normally (for example, almost in real time) acquired, the acquirer 110 may generate the abnormality information by analyzing the room information instead of acquiring the abnormality information from the equipment 210. This analysis may be performed by a device other than the equipment management device 10. In this case, the acquirer 110 acquires the abnormality information from the device.

Subsequently, the conference information generator 120 generates conference information by processing the room information (Step S20).

For example, the conference information generator 120 generates text data indicating spoken details in the conference room 20 from voice information generated by the microphone 226. When a key word indicating occurrence of an abnormality is not included in the text data, the conference information generator 120 generates conference information indicating that a conference is in progress. When a key word indicating that occurrence of an abnormality is included in the text data, the conference information generator 120 generates conference information indicating that the conference has stopped. When a key word indicating that the conference has ended is included in the text data, the conference information generator 120 generates conference information indicating that the conference has ended. For example, the key words are stored in advance in the equipment management device 10.

For example, the conference information generator 120 generates person information using an image generated by the imaging device 224 and generates the conference information using the person information. For example, when all persons in the conference room 20 sit, the conference information generator 120 generates the conference information indicating that the conference is in progress. When a plurality of persons are located near the equipment 210 or when a plurality of persons alternately comes near the equipment 210, the conference information generator 120 generates the conference information indicating that the conference has stopped. When persons in the conference room 20 simultaneously starts movement, the conference information generator 120 generates the conference information indicating that the conference has ended.

For example, the conference information generator 120 may generate the conference information using the number of persons in the conference room 20. For example, the conference information generator 120 acquires the number of persons scheduled to participate in the conference and generates the conference information indicating that the conference is in progress when a ratio of the number of persons in the conference room 20 to the number of persons scheduled to participate in the conference is equal to or greater than a reference ratio. Here, the number of persons in the conference room 20 is identified, for example, by processing an image generated by the imaging device 224. The conference information generator 120 acquires the number of persons scheduled to participate in the conference, for example, from a schedule management device.

For example, the conference information generator 120 may generate the conference information using the number of persons who have spoken within a predetermined time (for example, within 3 minutes) immediately before. For example, the conference information generator 120 identifies the number of persons having spoken using voiceprints included in voice data generated by the microphone 226. When the number of persons having spoken satisfies a reference, the conference information generator 120 generates the conference information indicating that the conference is in progress.

For example, the conference information generator 120 may generate the conference information using the number of persons looking at a screen of a display or a projection surface of a projector. For example, when the number of persons satisfies a reference, the conference information generator 120 generates the conference information indicating that the conference is in progress. The number of persons looking at a screen of a display or a projection surface of a projector is identified, for example, by processing an image generated by the imaging device 224.

For example, the conference information generator 120 may generate the conference information using whether input data of the display or the projector changes. For example, when input data of the display or the projector starts change, the conference information generator 120 generates the conference information indicating that the conference is in progress.

When the conference information is generated using the voice information generated by the microphone 226, the conference information generator 120 may generate the conference information using results obtained by machine learning based on the voice information or the text information. When the conference information is generated using the image generated by the imaging device 224, the conference information generator 120 may generate the conference information using results obtained by machine learning based on the image.

Subsequently, the information transmitter 130 identifies abnormality-relevant information to be transmitted, for example, control information for coping with the abnormality, using the type of the abnormality. The information transmitter 130 determines a timing at which the control information is transmitted to the equipment 210, that is, a first timing, using the conference information (Step S30). Here, the information transmitter 130 preferably determines the first timing additionally using the abnormality information. More specifically, the abnormality information includes information indicating details of the abnormality occurring in the equipment 210. Then, the information transmitter 130 determines the first timing using details of the abnormality indicated by the abnormality information. This is because quick countermeasures may be needed according to the type of the abnormality. Subsequently, the information transmitter 130 transmits the control information at the first timing (Step S40). Instead of Steps S30 and S40, the information transmitter 130 may transmit the control information to the equipment 210 when the conference information satisfies a reference.

A specific example of the first timing will be described below. In this example, when details of the abnormality satisfy a specific condition, the information transmitter 130 does not transmit the abnormality-relevant information until the conference information indicates that the conference has stopped or ended. When details of the abnormality do not satisfy the specific condition, the information transmitter 130 may transmit the abnormality-relevant information immediately after the abnormality has been detected.

For example, when the equipment 210 is a display or a projector and the abnormality information indicates that a video signal has not been input to the equipment, the abnormality-relevant information is control information. The control information is information for causing the equipment 210 to display an alert. When the conference information indicates that the conference is in progress, the information transmitter 130 transmits the control information immediately.

When the equipment 210 is a display or a projector including a plurality of video input terminals and the abnormality information indicates that a video signal is input to the equipment 210 but a selected input terminal is not an input terminal to which display data is being input, the abnormality-relevant information is control information. The control information is a control command for causing the equipment 210 to select the input terminal to which display data is being input. When the conference information indicates that the conference is in progress, the information transmitter 130 transmits the conference information immediately.

It is assumed that the equipment 210 is a display or a projector and contrast (a luminance difference) of display can be identified by processing an image obtained by imaging a display of the display or the projector (for example, an image generated by the imaging device 224). For example, the equipment 210 or a management device thereof identifies a difference between luminance of characters in the image and luminance near the characters as contrast. An example of the abnormality information indicates that the contrast is equal to or less than a reference. In this case, the abnormality-relevant information is control information. The control information is information for causing the equipment 210 to change display (projection) parameters such that the contrast increases. When the conference information indicates that the conference is in progress, the information transmitter 130 transmits the control information immediately.

In the example, when the equipment 210 additionally includes a light in the conference room 20, the information transmitter 130 may further control brightness of the light instead of or in addition to control of the display or the projector. With this configuration, it is also possible to improve visibility of a screen or a projected image.

When the equipment 210 is a projector, a decrease in contrast may be caused by deterioration of a light source. In this case, the control information is information for causing the projector to display a recommendation for exchanging the light source of the projector. When the conference information indicates that the conference has not started, that the conference has stopped, or that the conference has ended, the information transmitter 130 transmits control information for performing the displaying. Here, the information transmitter 130 preferably transmits the control information when the conference has stopped or ended.

The information transmitter 130 may additionally transmit the abnormality-relevant information to the manager terminal 30 such that a recommendation for exchanging the light source of the projector is displayed thereon. The timing at which the abnormality-relevant information is transmitted is arbitrary and the abnormality-relevant information may be transmitted, for example, immediately after the abnormality information has been acquired.

In this example, the equipment 210 may count a cumulative emission time of the light source. In this case, the information transmitter 130 acquires the cumulative emission time from the equipment 210 after the acquirer 110 has acquired the abnormality information. At this time, the equipment 210 may transmit the cumulative emission time in response to a request from the information transmitter 130. The information transmitter 130 may set a condition that the cumulative emission time is greater than a reference time as the condition for transmitting the abnormality-relevant information (which may be control information). The equipment 210 may transmit the cumulative emission time along with the abnormality information to the equipment management device 10.

When the equipment 210 is air conditioning equipment, an example of details of the abnormality indicated by the abnormality information is that the room temperature departs from a reference range. In this case, the information transmitter 130 transmits the abnormality-relevant information when the conference information indicates that the conference has stopped or ended. That is, when the equipment 210 is air conditioning equipment, the "specific condition" in the details of the abnormality is a condition that the room temperature departs from the reference range. The abnormality-relevant information which is transmitted may be questionnaire data and may indicate maintenance to be performed on the equipment 210. Details of a questionnaire which is transmitted herein relate to, for example, a degree of comfortableness from the room temperature of the conference room 20. The method of transmitting questionnaire data is the same as in a second embodiment which will be described later.

The destination of the abnormality-relevant information may be a display device, for example, the display or the projector, in the conference room 20 or may be the manager terminal 30.

On the other hand, when the equipment 210 is air conditioning equipment and details of the abnormality indicated by the abnormality information are that the air conditioning equipment does not operate (that is, when the specific condition is not satisfied), the information transmitter 130 transmits the abnormality-relevant information immediately.

When the equipment 210 is a device having a battery therein such as a radio microphone, a remote controller, or an electronic pen, the equipment 210 transmits information indicating that at least a state of charge or an output voltage of the battery is equal to or less than a reference value as the abnormality information to the equipment management device 10 when this situation occurs. Then, the information transmitter 130 of the equipment management device 10 transmits the abnormality-relevant information, for example, information for outputting a recommendation for exchanging the battery to the display or the projector in the conference room 20 when the conference information indicates that the conference has stopped or ended. That is, when the equipment 210 is a device having a battery therein, the "specific condition" in the details of the abnormality is a condition that the state of charge or the output voltage of the battery is equal to or less than the reference value. The abnormality-relevant information which is transmitted herein is, for example, for performing display or voice output for recommending exchange of the battery. The information transmitter 130 may transmit the information to the manager terminal 30. At this time, the information transmitter 130 preferably performs transmission to the manager terminal 30 immediately after the abnormality information has been acquired.

In addition to the aforementioned example, the information transmitter 130 preferably transmits the control information when the conference information indicates that the conference has not started, that the conference has stopped, or that the conference has ended. In other words, in a standard state, the information transmitter 130 preferably transmits the control information when the conference information indicates that the conference has not started, that the conference has stopped, or that the conference has ended.

According to this embodiment, when an abnormality occurs in the equipment 210 in the conference room 20, the information transmitter 130 of the equipment management device 10 transmits control information for coping with the abnormality to the equipment 210. Here, the information transmitter 130 determines the timing at which the control information is transmitted to the equipment 210 using conference information indicating a conference status. Alternatively, the information transmitter 130 transmits the control information to the equipment 210 when the conference information satisfies a reference. Accordingly, it is possible to cope with an abnormality in the equipment 210 at an appropriate timing.

In this embodiment, the microphone 226 illustrated in FIG. 1 may be a so-called smart speaker. In this case, the smart speaker also includes a speaker in addition to the microphone 226. A user of the conference room 20 can operate the equipment 210 using the smart speaker. Specifically, the information transmitter 130 of the equipment management device 10 generates information for operating the equipment 210 using voice data input to the microphone of the smart speaker and transmits the information to the equipment 210.

For example, the smart speaker or the information transmitter 130 of the equipment management device 10 analyzes details of a conversation in the conference room 20. When the details satisfy a specific condition, the information transmitter 130 determines that an abnormality occurs in the conference room 20, identifies details of the abnormality, and generates the abnormality information. The information transmitter 130 generates abnormality-relevant information including the voice data. The information transmitter 130 transmits the voice data to the smart speaker. Then, the smart speaker outputs voice on the basis of the voice data.

For example, when the equipment 210 is a display device such as a display or a projector, an image which has been apparently input from the outside may not be displayed on the display device. In this case, a conversation in the conference room 20 is likely to include a phrase such as "not displayed" or "not visible." When such a phrase is included in the conversation, the information transmitter 130 outputs a voice such as "Is right terminal selected?" or "will input terminal be switched to another?" from the smart speaker. For example, when a voice "Will input terminal be switched to another?" is output from the smart speaker and a word indicating "YES" is acquired by the microphone of the smart speaker, the information transmitter 130 transmits a command for switching the input terminal to the equipment 210.

When the equipment 210 is a display device such as a display or a projector, contrast or brightness of such display may be changed. For example, the information transmitter 130 can identify contrast or brightness of the display by processing an image obtained by imaging a display of the display or the projector (for example, an image generated by the imaging device 224). When the contrast or brightness is equal to or less than a reference, the information transmitter 130 outputs a voice such as "Will contrast be increased?" or "Will screen be brighter?" from the smart speaker. When a word indicating "YES" is acquired by the microphone of the smart speaker, the information transmitter 130 transmits a command for increasing the contrast (or making the screen brighter) to the equipment 210.

For example, a case in which an Internet conference is held in the conference room 20 will be considered. In this case, the equipment 210 is a device (for example, a personal computer) that is used for the Internet conference. The information transmitter 130 can identify movement of a mouse of a person in the conference room 20 by processing an image generated by the imaging device 224 and thus determine whether the person utters words. When the person utters words and an output from the microphone 226 in the equipment 210 is zero, the information transmitter 130 outputs a voice such as "Is microphone mute?" or "Will muteness of microphone be resolved?" from the speaker. When a word indicating "YES" is acquired by the microphone of the smart speaker as a response to the voice "Will muteness of microphone be resolved?," the information transmitter 130 outputs a command for resolving muteness of the microphone 226 to the equipment 210.

Second Embodiment

Figure 5:
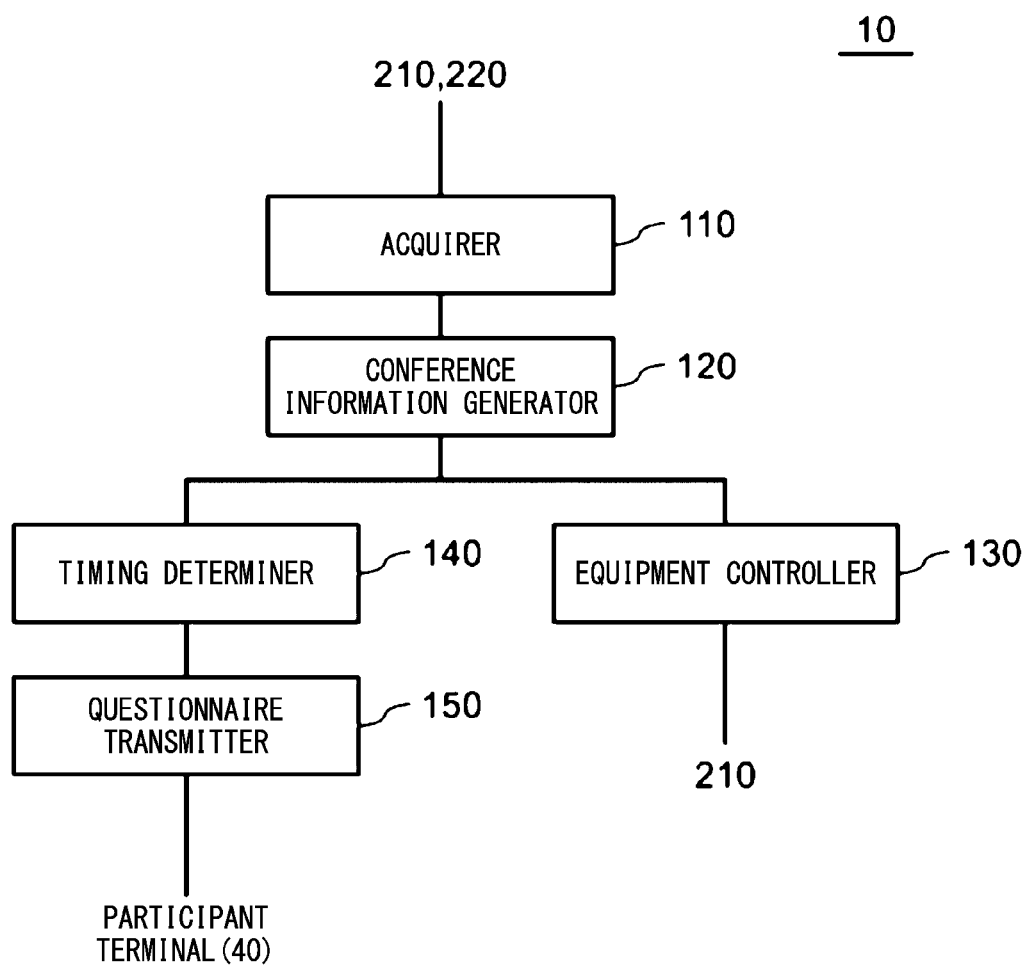
FIG. 5 is a diagram illustrating an example of a functional configuration of an equipment management device according to a second embodiment.

FIG. 5 is a diagram illustrating an example of a functional configuration of an equipment management device 10 according to a second embodiment. The equipment management device 10 illustrated in the drawing has the same configuration as the equipment management device 10 according to the first embodiment except that a timing determiner 140 and a questionnaire transmitter 150 are provided.

The questionnaire transmitter 150 transmits questionnaire data indicating a questionnaire associated with a conference room 20 to a display device (for example, a display or a projector) or a terminal of a conference participant in the conference room 20. The terminal of a conference participant is identified, for example, using a mail address of the participant. In this case, the questionnaire transmitter 150 acquires the mail address of the participant, for example, from a schedule management device for the conference room 20.

When an abnormality occurs in equipment 210, the questionnaire transmitter 150 may determine (or correct) the questionnaire data additionally using abnormality information transmitted from the equipment 210. For example, the questionnaire transmitter 150 adds an item associated with the type of the abnormality indicated by the abnormality information to the questionnaire data. The information required for generating the questionnaire data is stored in advance in the questionnaire transmitter 150. For example, the questionnaire transmitter 150 stores an item for each type of the equipment 210 and for each type of an abnormality. The questionnaire transmitter 150 adds an item corresponding to the abnormality information received from the equipment 210 to the questionnaire data.

Then, the timing determiner 140 determines a timing at which the questionnaire data is transmitted (hereinafter referred to as a second timing) using the conference information generated by the conference information generator 120. For example, when the conference information satisfies a reference, specifically, the timing determiner 140 transmits the questionnaire data at a timing at which a conference has ended.

Instead of transmitting the questionnaire data by a mail, the timing determiner 140 may display details of a questionnaire or information indicating that there is questionnaire using the projector or the display in the conference room 20 and display code information indicating an URL for inputting response data using the projector or the display.

According to this embodiment, the same advantages as in the first embodiment can be achieved. It is possible to transmit questionnaire data indicating a questionnaire associated with the conference room 20. In this embodiment, questionnaire data instead of control information may be used as equipment-relevant information. In this case, the timing determiner 140 and the questionnaire transmitter 150 may be omitted.

While embodiments of the present invention have been described above with reference to the drawings, the embodiments are merely examples of the present invention and various configurations other than described above may be employed.

A plurality of steps (processes) are sequentially described in the plurality of flowcharts described above, but the order for performing the steps in the embodiments is not limited to that described above. In the embodiments, the order of the steps illustrated in the flowcharts can be changed as long as it does not interfere with details of the steps. The aforementioned embodiments can be combined as long as conflictions in details do not arise.

Some or all of the aforementioned embodiments may be described as the following additional configurations, but the present invention is not limited thereto.

1. An equipment management device including:
   an acquirer configured to acquire abnormality information indicating that an abnormality has occurred in equipment provided in a conference room;
   a conference information generator configured to generate conference information indicating a progress status of a conference which is carried out in the conference room by processing information output from a device provided in the conference room; and
   an information transmitter configured to make a first timing different, the first timing being a timing at which abnormality-relevant information which is information to be transmitted due to occurrence of the abnormality is transmitted according to the progress status of the conference indicated by the conference information and to transmit the abnormality-relevant information to the equipment or another device at the first timing.

2. The equipment management device according to 1, wherein the information transmitter is configured to select the first timing from a plurality of candidates when the first timing is made different according to the progress status of the conference, and
   wherein the plurality of candidates include at least a timing at which the abnormality-relevant information is transmitted immediately and a timing at which the abnormality-relevant information is transmitted later.

3. The equipment management device according to 1 or 2, wherein the conference information includes at least one of information indicating that the conference is in progress, information indicating that the conference has stopped, and information indicating that the conference has ended.

4. The equipment management device according to any one of 1 to 3, wherein the abnormality information includes information indicating details of the abnormality, and
   wherein the information transmitter is configured to determine the first timing additionally using the details of the abnormality indicated by the abnormality information.

5. The equipment management device according to 4, wherein the information transmitter is configured not to transmit the abnormality-relevant information until the conference stops or ends when the details of the abnormality satisfy a specific condition.

6. The equipment management device according to 5, wherein the equipment is air conditioning equipment that adjusts the room temperature of the conference room, and
   wherein the specific condition is a condition that the room temperature departs from a reference range.

7. The equipment management device according to 5, wherein the equipment has a battery therein, and
   wherein the specific condition is a condition that a state of charge or an output voltage of the battery is equal to or less than a reference.

8. The equipment management device according to 4, wherein the equipment is a display or a projector, wherein the abnormality information indicates that a video signal is not input to the equipment, wherein the information transmitter is configured to determine the first timing such that the abnormality-relevant information is transmitted while the conference is processing when the conference information indicates that the conference is processing, and wherein the abnormality-relevant information is information for displaying an alert.

9. The equipment management device according to 4, wherein the equipment is a display or a projector including a plurality of video input terminals, wherein the abnormality information indicates that a video signal is input to the equipment but a selected input terminal is not the input terminal to which display data is input, wherein the information transmitter is configured to determine the first timing such that the abnormality-relevant information is transmitted while the conference is processing when the conference information indicates that the conference is processing, and wherein the abnormality-relevant information is a control command for causing the equipment to select the input terminal to which the display data is input.

10. The equipment management device according to 4, wherein the equipment is a display or a projector, wherein the abnormality information is generated by processing an image acquired by imaging a display on the display or the projector and indicates that contrast of the display is equal to or less than a reference, wherein the information transmitter is configured to determine the first timing such that the abnormality-relevant information is transmitted while the conference is processing when the conference information indicates that the conference is processing, and wherein the abnormality-relevant information is information for instructing the equipment to increase the contrast.

11. The equipment management device according to 9, wherein the equipment further includes a light in the conference room, and wherein the abnormality-relevant information further is information for controlling brightness of the light.

12. The equipment management device according to 4, wherein the equipment is a projector, wherein the abnormality-relevant information is generated by processing an image acquired by imaging a result of display by the projector and indicates that contrast of the image is equal to or less than a reference, wherein the information transmitter is configured to determine the first timing such that the abnormality-relevant information is transmitted when the conference has not started, when the conference has stopped, or when the conference has ended, and wherein the abnormality-relevant information is information for instructing the projector to display a message for recommending exchange of a light source of the projector.

13. The equipment management device according to 12, wherein the information transmitter is configured to further cause a terminal of a manager of the conference room to recommend exchange of the light source of the projector.

14. The equipment management device according to 12 or 13, wherein the information transmitter is configured to determine the first timing such that the abnormality-relevant information is transmitted after the conference has ended.

15. The equipment management device according to any one of 12 to 14, wherein the information transmitter is configured to set a condition that a cumulative emission time of the light source is greater than a reference time as the condition for performing the display.

16. The equipment management device according to any one of 1 to 15, wherein the abnormality-relevant information is questionnaire data indicating a questionnaire associated with the conference room.

17. The equipment management device according to any one of 1 to 15, further including:

a questionnaire transmitter configured to transmit questionnaire data indicating a questionnaire associated with the conference room to a display device in the conference room or a terminal of a participant of the conference; and a timing determiner configured to determine a second timing at which the questionnaire data is transmitted using the conference information.

18. The equipment management device according to 16 or 17, wherein the questionnaire data is determined using the abnormality information.

19. An equipment management method that is performed by a computer, the equipment management method including:

acquiring abnormality information indicating that an abnormality has occurred in equipment provided in a conference room;

generating conference information indicating a progress status of a conference which is carried out in the conference room by processing information output from a device provided in the conference room; and making a first timing different, the first timing being a timing at which abnormality-relevant information which is information to be transmitted due to occurrence of the abnormality is transmitted according to the progress status of the conference indicated by the conference information and transmitting the abnormality-relevant information to the equipment or another device at the first timing.

20. The equipment management method according to 19, further including selecting the first timing from a plurality of candidates when the first timing is made different according to the progress status of the conference wherein the plurality of candidates include at least a timing at which the abnormality-relevant information is transmitted immediately and a timing at which the abnormality-relevant information is transmitted later.

21. The equipment management method according to 19 or 20, wherein the conference information includes at least one of information indicating that the conference is in progress, information indicating that the conference has stopped, and information indicating that the conference has ended.

22. The equipment management method according to any one of 19 to 21, wherein the abnormality information includes information indicating details of the abnormality, and wherein the equipment management method further includes determining the first timing additionally using the details of the abnormality indicated by the abnormality information.

23. The equipment management method according to 22, further including not transmitting the abnormality-relevant information until the conference stops or ends when the details of the abnormality satisfy a specific condition.

24. The equipment management method according to 23, wherein the equipment is air conditioning equipment that adjusts the room temperature of the conference room, and
wherein the specific condition is a condition that the room temperature departs from a reference range.

25. The equipment management method according to 23, wherein the equipment has a battery therein, and
wherein the specific condition is a condition that a state of charge or an output voltage of the battery is equal to or less than a reference.

26. The equipment management method according to 22, wherein the equipment is a display or a projector,
wherein the abnormality information indicates that a video signal is not input to the equipment,
wherein the equipment management method further includes determining the first timing such that the abnormality-relevant information is transmitted while the conference is processing when the conference information indicates that the conference is processing, and
wherein the abnormality-relevant information is information for displaying an alert.

27. The equipment management method according to 22, wherein the equipment is a display or a projector including a plurality of video input terminals,
wherein the abnormality information indicates that a video signal is input to the equipment but a selected input terminal is not the input terminal to which display data is input,
wherein the equipment management method further includes determining the first timing such that the abnormality-relevant information is transmitted while the conference is processing when the conference information indicates that the conference is processing, and
wherein the abnormality-relevant information is a control command for causing the equipment to select the input terminal to which the display data is input.

28. The equipment management method according to 22, wherein the equipment is a display or a projector,
wherein the abnormality information is generated by processing an image acquired by imaging a display on the display or the projector and indicates that contrast of the display is equal to or less than a reference,
wherein the equipment management method further includes determining the first timing such that the abnormality-relevant information is transmitted while the conference is processing when the conference information indicates that the conference is processing, and
wherein the abnormality-relevant information is information for instructing the equipment to increase the contrast.

29. The equipment management method according to 27, wherein the equipment further includes a light in the conference room, and
wherein the abnormality-relevant information further is information for controlling brightness of the light.

30. The equipment management method according to 22, wherein the equipment is a projector,
wherein the abnormality-relevant information is generated by processing an image acquired by imaging a result of display by the projector and indicates that contrast of the image is equal to or less than a reference, wherein the equipment management method further includes determining the first timing such that the abnormality-relevant information is transmitted when the conference has not started, when the conference has stopped, or when the conference has ended, and
wherein the abnormality-relevant information is information for instructing the projector to display a message for recommending exchange of a light source of the projector.

31. The equipment management method according to 30, further including causing a terminal of a manager of the conference room to recommend exchange of the light source of the projector.

32. The equipment management method according to 30 or 31, further comprising determining the first timing such that the abnormality-relevant information is transmitted after the conference has ended.

33. The equipment management method according to any one of 30 to 32, further comprising setting a condition that a cumulative emission time of the light source is greater than a reference time as the condition for performing the display.

34. The equipment management method according to any one of 19 to 33, wherein the abnormality-relevant information is questionnaire data indicating a questionnaire associated with the conference room.

35. The equipment management method according to any one of 19 to 33, further including:
transmitting questionnaire data indicating a questionnaire associated with the conference room to a display device in the conference room or a terminal of a participant of the conference; and
determining a second timing at which the questionnaire data is transmitted using the conference information.

36. The equipment management method according to 34 or 35, wherein the questionnaire data is determined using the abnormality information.

37. A program causing a computer to perform:
acquiring abnormality information indicating that an abnormality has occurred in equipment provided in a conference room;
generating conference information indicating a progress status of a conference which is carried out in the conference room by processing information output from a device provided in the conference room; and
making a first timing different, the first timing being a timing at which abnormality-relevant information which is information to be transmitted due to occurrence of the abnormality is transmitted according to the progress status of the conference indicated by the conference information and transmitting the abnormality-relevant information to the equipment or another device at the first timing.

38. The program according to 37, wherein the transmission is configured to select the first timing from a plurality of candidates when the first timing is made different according to the progress status of the conference, and
wherein the plurality of candidates include at least a timing at which the abnormality-relevant information is transmitted immediately and a timing at which the abnormality-relevant information is transmitted later.

39. The program according to 37 or 38, wherein the conference information includes at least one of information indicating that the conference is in progress, information indicating that the conference has stopped, and information indicating that the conference has ended.

40. The program according to any one of 37 to 39, wherein the abnormality information includes information indicating details of the abnormality, and
wherein the transmission is configured to determine the first timing additionally using the details of the abnormality indicated by the abnormality information.

41. The program according to 40, wherein the transmission is configured not to transmit the abnormality-relevant information until the conference stops or ends when the details of the abnormality satisfy a specific condition.

42. The program according to 41, wherein the equipment is air conditioning equipment that adjusts the room temperature of the conference room, and
wherein the specific condition is a condition that the room temperature departs from a reference range.

43. The program according to 41, wherein the equipment has a battery therein, and
wherein the specific condition is a condition that a state of charge or an output voltage of the battery is equal to or less than a reference.

44. The program according to 40, wherein the equipment is a display or a projector,
wherein the abnormality information indicates that a video signal is not input to the equipment, wherein the transmission is configured to determine the first timing such that the abnormality-relevant information is transmitted while the conference is processing when the conference information indicates that the conference is processing, and
wherein the abnormality-relevant information is information for displaying an alert.

45. The program according to 40, wherein the equipment is a display or a projector including a plurality of video input terminals,
wherein the abnormality information indicates that a video signal is input to the equipment but a selected input terminal is not the input terminal to which display data is input,
wherein the transmission is configured to determine the first timing such that the abnormality-relevant information is transmitted while the conference is processing when the conference information indicates that the conference is processing, and
wherein the abnormality-relevant information is a control command for causing the equipment to select the input terminal to which the display data is input.

46. The program according to 40, wherein the equipment is a display or a projector,
wherein the abnormality information is generated by processing an image acquired by imaging a display on the display or the projector and indicates that contrast of the display is equal to or less than a reference,
wherein the transmission is configured to determine the first timing such that the abnormality-relevant information is transmitted while the conference is processing when the conference information indicates that the conference is processing, and
wherein the abnormality-relevant information is information for instructing the equipment to increase the contrast.

47. The program according to 45, wherein the equipment further includes a light in the conference room, and
wherein the abnormality-relevant information further is information for controlling brightness of the light.

48. The program according to 40, wherein the equipment is a projector,
wherein the abnormality-relevant information is generated by processing an image acquired by imaging a result of display by the projector and indicates that contrast of the image is equal to or less than a reference,
wherein the transmission is configured to determine the first timing such that the abnormality-relevant information is transmitted when the conference has not started, when the conference has stopped, or when the conference has ended, and
wherein the abnormality-relevant information is information for instructing the projector to display a message for recommending exchange of a light source of the projector.

49. The program according to 48, wherein the transmission is configured to further cause a terminal of a manager of the conference room to recommend exchange of the light source of the projector.

50. The program according to 48 or 49, wherein the transmission is configured to determine the first timing such that the abnormality-relevant information is transmitted after the conference has ended.

51. The program according to any one of 48 to 50, wherein the transmission is configured to set a condition that a cumulative emission time of the light source is greater than a reference time as the condition for performing the display.

52. The program according to any one of 37 to 51, wherein the abnormality-relevant information is questionnaire data indicating a questionnaire associated with the conference room.

53. The program according to any one of 37 to 51, causing the computer to further perform:
a questionnaire transmission configured to transmit questionnaire data indicating a questionnaire associated with the conference room to a display device in the conference room or a terminal of a participant of the conference; and
a timing determination configured to determine a second timing at which the questionnaire data is transmitted using the conference information.

54. The program according to 52 or 53, wherein the questionnaire data is determined using the abnormality information.

Priority is claimed on PCT International Application No. PCT/JP2019/38485, filed Sep. 30, 2019, the content of which is incorporated herein by reference.

REFERENCE SIGNS LIST

10 Equipment management device
20 Conference room
30 Manager terminal
110 Acquirer
120 Conference information generator
130 Information transmitter
140 Timing determiner
150 Questionnaire transmitter
210 Equipment
220 Device group
222 Lighting control device
224 Imaging device
226 Microphone
228 Sensor

The invention claimed is:

1. An equipment management device comprising:
   an acquirer configured to acquire abnormality information indicating that an abnormality has occurred in equipment provided in a conference room, the abnormality information including information indicating details of the abnormality;
   a conference information generator configured to generate conference information indicating a progress status of a conference which is carried out in the conference room by processing information output from a device provided in the conference room; and
   an information transmitter configured
      to make a first timing different, the first timing being a timing at which abnormality-relevant information which is information to be transmitted due to occurrence of the abnormality is transmitted according to the progress status of the conference indicated by the conference information, and
      the details of the abnormality indicated by the abnormality information, and
      to transmit the abnormality-relevant information to the equipment or another device at the first timing.

2. The equipment management device according to claim 1, wherein the information transmitter is configured to select the first timing from a plurality of candidates when the first timing is made different according to the progress status of the conference, and
   wherein the plurality of candidates include at least a timing at which the abnormality-relevant information is transmitted immediately and a timing at which the abnormality-relevant information is transmitted later.

3. The equipment management device according to claim 1, wherein the conference information includes at least one of information indicating that the conference is in progress, information indicating that the conference has stopped, and information indicating that the conference has ended.

4. The equipment management device according to claim 1, wherein the information transmitter is configured not to transmit the abnormality-relevant information until the conference stops or ends when the details of the abnormality satisfy a specific condition.

5. The equipment management device according to claim 4, wherein the equipment comprises air conditioning equipment that adjusts the room temperature of the conference room, and
   wherein the specific condition comprises a condition that the room temperature departs from a reference range.

6. The equipment management device according to claim 4, wherein the equipment has a battery therein, and
   wherein the specific condition comprises a condition that a state of charge or an output voltage of the battery is equal to or less than a reference.

7. The equipment management device according to claim 1, wherein the equipment comprises a display or a projector,
   wherein the abnormality information indicates that a video signal is not input to the equipment,
   wherein the information transmitter is configured to determine the first timing such that the abnormality-relevant information is transmitted while the conference is in progress when the conference information indicates that the conference is in progress, and
   wherein the abnormality-relevant information comprises information for displaying an alert.

8. The equipment management device according to claim 1, wherein the equipment comprises a display or a projector including a plurality of video input terminals,
   wherein the abnormality information indicates that a video signal is input to the equipment but a selected input terminal is not the input terminal to which display data is input,
   wherein the information transmitter is configured to determine the first timing such that the abnormality-relevant information is transmitted while the conference is in progress when the conference information indicates that the conference is in progress, and
   wherein the abnormality-relevant information comprises a control command for causing the equipment to select the input terminal to which the display data is input.

9. The equipment management device according to claim 1, wherein the equipment comprises a display or a projector,
   wherein the abnormality information is generated by processing an image acquired by imaging a display on the display or the projector and indicates that contrast of the display is equal to or less than a reference,
   wherein the information transmitter is configured to determine the first timing such that the abnormality-relevant information is transmitted while the conference is in progress when the conference information indicates that the conference is in progress, and
   wherein the abnormality-relevant information comprises information for instructing the equipment to increase the contrast.

10. The equipment management device according to claim 8, wherein the equipment further includes a light in the conference room, and
    wherein the abnormality-relevant information further comprises information for controlling brightness of the light.

11. The equipment management device according to claim 1, wherein the equipment comprises a projector,
    wherein the abnormality-relevant information is generated by processing an image acquired by imaging a result of display by the projector and indicates that contrast of the image is equal to or less than a reference,
    wherein the information transmitter is configured to determine the first timing such that the abnormality-relevant information is transmitted when the conference has not started, when the conference has stopped, or when the conference has ended, and
    wherein the abnormality-relevant information comprises information for instructing the projector to display a message for recommending exchange of a light source of the projector.

12. The equipment management device according to claim 11, wherein the information transmitter is configured to further cause a terminal of a manager of the conference room to recommend exchange of the light source of the projector.

13. The equipment management device according to claim 11, wherein the information transmitter is configured to determine the first timing such that the abnormality-relevant information is transmitted after the conference has ended.

14. The equipment management device according to claim 11, wherein the information transmitter is configured to set a condition that a cumulative emission time of the light source is greater than a reference time as the condition for performing the display.

15. The equipment management device according to claim 1, wherein the abnormality-relevant information comprises questionnaire data indicating a questionnaire associated with the conference room.

16. The equipment management device according to claim 1, further comprising:
a questionnaire transmitter configured to transmit questionnaire data indicating a questionnaire associated with the conference room to a display device in the conference room or a terminal of a participant of the conference; and
a timing determiner configured to determine a second timing at which the questionnaire data is transmitted using the conference information.

17. The equipment management device according to claim 15, wherein the questionnaire data is determined using the abnormality information.

18. An equipment management method that is performed by a computer, the equipment management method comprising:
acquiring abnormality information indicating that an abnormality has occurred in equipment provided in a conference room, the abnormality information including information indicating details of the abnormality;
generating conference information indicating a progress status of a conference which is carried out in the conference room by processing information output from a device provided in the conference room;
making a first timing different, the first timing being a timing at which abnormality-relevant information which comprises information to be transmitted due to occurrence of the abnormality is transmitted according to
the progress status of the conference indicated by the conference information, and
the details of the abnormality indicated by the abnormality information; and
transmitting the abnormality-relevant information to the equipment or another device at the first timing.

19. An equipment management device comprising:
an acquirer configured to acquire abnormality information indicating that an abnormality has occurred in equipment provided in a conference room;
a conference information generator configured to generate conference information indicating a progress status of a conference which is carried out in the conference room by processing information output from a device provided in the conference room; and
an information transmitter configured to make a first timing different the first timing being a timing at which abnormality-relevant information which comprises information to be transmitted due to occurrence of the abnormality is transmitted according to the progress status of the conference indicated by the conference information and to transmit the abnormality-relevant information to the equipment or another device at the first timing,
wherein the information transmitter is configured to select the first timing from a plurality of candidates when the first timing is made different according to the progress status of the conference, and
wherein the plurality of candidates include at least a timing at which the abnormality-relevant information is transmitted immediately and a timing at which the abnormality-relevant information is transmitted later.

* * * * *